(12) United States Patent
Prutsman et al.

(10) Patent No.: US 9,829,216 B2
(45) Date of Patent: Nov. 28, 2017

(54) SOLAR COLLECTOR COMPRISING AN OPAQUE COVER

(71) Applicants: Jeffrey D. Prutsman, Lake Mary, FL (US); John D. Prutsman, Lake Mary, FL (US)

(72) Inventors: Jeffrey D. Prutsman, Lake Mary, FL (US); John D. Prutsman, Lake Mary, FL (US)

( * ) Notice: Subject to any disclaimer, the term of this patent is extended or adjusted under 35 U.S.C. 154(b) by 784 days.

(21) Appl. No.: 14/252,765

(22) Filed: Apr. 14, 2014

(65) Prior Publication Data

US 2014/0305425 A1    Oct. 16, 2014

Related U.S. Application Data

(60) Provisional application No. 61/811,495, filed on Apr. 12, 2013.

(51) Int. Cl.
*F24J 2/50* (2006.01)
*F24J 2/32* (2006.01)
(Continued)

(52) U.S. Cl.
CPC .......... *F24J 2/32* (2013.01); *F24J 2/243* (2013.01); *F24J 2/245* (2013.01); *F24J 2/248* (2013.01); *F24J 2/4643* (2013.01); *F24J 2/4645* (2013.01); *F24J 2/4652* (2013.01); *F24J 2/482* (2013.01); *F24J 2/485* (2013.01); *F24J 2/505* (2013.01);
(Continued)

(58) Field of Classification Search
USPC ............... 126/652–653, 676, 650, 704–708
See application file for complete search history.

(56) References Cited

U.S. PATENT DOCUMENTS 3,934,323 A      1/1976  Ford et al.
3,943,911 A  *  3/1976  Yu .......................... F24J 2/204
                                                            126/643
(Continued)

OTHER PUBLICATIONS

Braendle, Stefan (2010). "Collector Coatings Evolve From Black Paint to Selective Surfaces," Solar Industry Magazine, Nov. 2010. Zackin Publications Inc.

(Continued)

*Primary Examiner* — Avinash Savani
*Assistant Examiner* — Vivek Shirsat (57) ABSTRACT

A solar collector has an opaque cover heated by solar energy. Heat flows from the opaque cover by conduction, convection, and infrared emittance across a gap within an at least substantially airtight enclosure to an absorber containing a working fluid. The exterior surface of the opaque cover has high solar energy absorptance and the interior surface has high infrared emittance. The exterior surface preferably has low infrared emittance. In one embodiment, fully wetted surface geometry permits direct and reflected infrared absorption by the absorber. The opaque cover eliminates the weight, cost and other shortcomings of glass. A hollow continuous side wall with rounded corners provides an embodiment that is robust yet economical, that is easy to manufacture and seal, that permits a reduced thickness of the opaque cover and mitigates the destructive potential of severe winds, and that can withstand the compressive forces experienced by an evacuated solar collector.

17 Claims, 9 Drawing Sheets

(51) Int. Cl.
  *F24J 2/48*  (2006.01)
  *F24J 2/24*  (2006.01)
  *F24J 2/46*  (2006.01)
  *F24J 2/51*  (2006.01)
  *F24J 2/52*  (2006.01)
  *F24J 2/10*  (2006.01)

(52) U.S. Cl.
  CPC ............... *F24J 2/51* (2013.01); *F24J 2/5211* (2013.01); *F24J 2002/1061* (2013.01); *F24J 2002/1071* (2013.01); *F24J 2002/508* (2013.01); *F24J 2002/5275* (2013.01); *Y02E 10/44* (2013.01); *Y02E 10/47* (2013.01)

(56) References Cited

U.S. PATENT DOCUMENTS

| | | | |
|---|---|---|---|
| 4,011,856 | A | 3/1977 | Gallagher |
| 4,060,070 | A | 11/1977 | Harter |
| 4,067,315 | A | 1/1978 | Fehlner |
| 4,092,977 | A * | 6/1978 | Gurtler ............... F24J 2/204 126/569 |
| 4,232,656 | A | 11/1980 | Teagan |
| 4,244,353 | A | 1/1981 | Straza |
| 4,332,241 | A | 6/1982 | Dalstein et al. |
| 5,692,491 | A | 12/1997 | Christensen et al. |
| 7,810,491 | B2 * | 10/2010 | Benvenuti ............... F24J 2/05 126/653 |
| 8,161,965 | B2 | 4/2012 | Palmieri |
| 2013/0327316 | A1 * | 12/2013 | Bourgeois ............... E04H 4/129 126/561 |
| 2015/0107582 | A1 * | 4/2015 | Jin ............... G02B 1/005 126/676 |

OTHER PUBLICATIONS

Burch, J. and Casey, R. (2009). "Wind Issues in Solar Thermal Performance Ratings," National Renewable Energy Laboratory, Conference Paper, NREL/CP-550-45466. Apr. 2009.
Burch, J., Hillman, T. and Salasovich, J. (2005). "An Assessment of Unglazed Solar Domestic Water Heaters," National Renewable Energy Laboratory, Conference Paper, NREL/CP-550-37759, Dec. 2005.
Chandler, William S., Whitlock, Charles H. and Stackhouse, Paul W., Jr. (2005). "Determining Wind Resources as a Function of Surface Roughness and Height from NASA Global Assimilation Analysis," Proceedings of the International Solar Energy Society, 2005 Solar World Congress, Orlando, Florida.
Colon, C.J. and Merrigan, T. (2001). "Roof Integrated Solar Absorbers: The Measured Performance of 'Invisible' Solar Collectors," National Renewable Energy Laboratory, Conference Paper, NREL/CP-610-30848, Apr. 2001.
Duffie, John A. (Deceased) and Beckman, William A. (2013) "Wind Convection Coefficients," Solar Engineering of Thermal Processes, Fourth Ed. 2013, Sec. 3.15, John Wiley & Sons, Inc., Hoboken, New Jersey. Kindle Edition.
Khoukhi, Maatouk and Maruyama, Shigenao (2005). "Theoretical approach of a flat plate solar collector with clear and low-iron glass covers taking into account the spectral absorption and emission within glass covers layer," Renewable Energy 30 (2005) 1177-1194.
Lin, J.X., Montpellier, P.R., Tillman, C.W. and W.I. Riker (2008). "Aerodynamic Devices for Mitigation of Wind Damage Risk," 4th International Conference on Advances in Wind and Structures (AWAS 08). Jeju, Korea, May 29-31, 2008.
Okamoto, S. and Uemura, N. (1991). "Effect of rounding side-corners on aerodynamic forces and turbulent wake of a cube placed on a ground plane," Experiments in Fluids, 11, 58-64. Springer-Verlag, 1991.
Applied Research Associates, Inc. (2002). "Development of Loss Relativities for Wind Resistive Features of Residential Structures," Florida Department of Community Affairs (DCA Contract 02-RC-11-14-00-22-003), Version 2.2, Mar. 28, 2002.
Braendle, Stefan (2010). "Collector Coatings Evolve From Black:Paint To: Selective Surfaces," Solar Industry Magazine; Nov. 2010. Zackin Publications Inc.
Burch, J. and Casey; R.. (2009).. "Wind Issues in Solar Thermal Performance: Ratings," Nationall Renewable Energy Laboratory, Conference Paper, NREL/CP-550-45466; Apr. 2009.
Burchi, J.,.Hillman, T. and Salasovich; J. (2005); "An Assessment of Unglazed Solan Domestic Water Heaters," National Renewable Energy Laboratory; Conference Paper, NREL/CP-550-377-59, Dec. 2005.
Chandler, William S., Whitlock, Charles-H..and Stackhouse, Paul W., Jr. (2005); "Determining Wind Resources as a Function of Surface-Roughness and Height from NASA Global Assimilation Analysis," Proceedings of the International Sollar Energy Society; 2005 Solar World Congress, Orlando, Florida.
Colon, C.J., and Merrigan, T. (2001). "Roof-Integrated Solar Absorbers:: The Measured Performance-of 'Invisible' Solar Collectors," National Renewable Energy Laboratory; Conference Paper, NREL/CP-610-30848, Apr. 2001.
Duffie, John A. (Deceased) and Beckman,. William A. (2013): "Wind Convection Coefficients,." Solar Engineering of Thermal Processes, Fourth Ed..2013, Sec. 3.115, John Wiley & Sons, Inc.,. Hoboken, New Jersey, Kindle Edition.
Khoukhi, Maratouk and Maruyama, Shigenao, (2005). "Theoretical approach of a flat plate: solar collector, with-clear and law-iron glass covers taking. into account the spectrall absorption and emission within glass covers layer," Renewable-Energy 30:(2005) 1177-11194.
Lin J.X., Montpellien, P:R:, Tillman, C:W. and W.I. Riker (2008): "Aerodynamic Devices for Mitigation of Wind Damage Risk," 4th International Conference on Advances in Wind and Structures. (AWAS 08). Jeju, Korea, May 29-31, 2008.
Okamoto,. S. and Uemura, N. (1991): "Effect of rounding side-corners on aerodynamic forces and turbulent wake-of a cube placed on a.ground plane," Experiments in Fluids, 11,.58-64. Springer-Verlag, 11991.
Applied Research Associates, Inc. (2002). "Development of Loss Relativities for Wind Resistive Features of Residential Structures," Flordia Department of Community Affairs (DCA Contract 02-RC-11-114-00-22-003); Version 2.2, Mar. 28, 2002.

* cited by examiner

SOLAR COLLECTOR COMPRISING AN OPAQUE COVER

CROSS-REFERENCE TO RELATED APPLICATIONS

This application claims priority to and the benefit of U.S. Provisional Application Ser. No. 61/811,495, filed on Apr. 12, 2013.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

Field of the Invention

The present invention relates to solar collectors, and more particularly to solar thermal collectors designed to heat a working fluid to temperatures within a range of 25° C. to 180° C.

Description of Related Art

The flat plate solar collector has not fundamentally changed since the 1970s. U.S. Pat. No. 4,011,856 to Gallagher (1977) teaches an exemplary design that fairly represents the vast majority of glazed flat plate solar collectors in use today. Such solar collectors typically employ tempered glass with reduced iron oxide content as the cover plate material. The glass must be thick enough to prevent sagging of unsupported spans. The glass must also have impact resistance and, in high wind zones, must be attached to the solar collector assembly with a frame and fasteners capable of withstanding the dynamic air pressures generated by severe windstorms. Consequently, the glass cover plate is typically either 3.2 or 4 millimeters thick, with corresponding weights of about 8 and 10 kg/m$^2$. The use of glass makes flat plate solar collectors difficult to handle and expensive to ship. Also, tempered glass is not impervious to breakage. While tempering produces excellent flat surface impact resistance, the edge strength is poor. A sheet of tempered glass can shatter when lateral compressive force (for example, the force from a solar collector being dropped on its side during handling) drives the head or length of an adjacent glazing frame screw into the edge of the glass.

Translucent plastics, including acrylics and polycarbonates, have been used as solar collector glazing in an attempt to reduce weight and cost. Unfortunately, these materials suffer significant reductions in transmittance over time due to discoloration and structural degradation, caused by accumulated exposure to ultraviolet radiation and stagnation temperatures. Plastic glazing materials also tend to experience unacceptable levels of outward bowing when exposed to the dynamic pressures associated with severe windstorms.

An additional problem for both transparent and translucent cover plate materials is that airborne dust and grime can accumulate on the glazing surface, which reduces solar energy transmittance. In many climates, the frequency and intensity of rainfall are not sufficient to remove accumulated dust and grime. Further, it is a practical reality that periodic manual glass cleaning is problematic for solar collectors on residential rooftops and in large commercial arrays.

The side walls of a typical glazed flat plate solar collector are formed of four elongated, straight aluminum extrusions, with 45-degree beveled ends and various extruded appendages extending outward from the vertical wall portions. The four side walls are joined at 90-degree angle corners, often reinforced with L-shaped brackets on the interior side of each corner. Screws, bolts, or rivets tighten the side walls to the L-shaped reinforcing brackets. These sharp angle corner joints have two shortcomings. First, the solar collector side walls expand and contract with daily temperature variations. Over time, repeated expansion and contraction can lead to small gaps at the corner joints. This problem may be exacerbated by a difference in the upper horizontal side wall and the lower horizontal side wall temperatures, leading to small but meaningful differences in the longitudinal expansion and contraction of the upper and lower horizontal side walls. With even the smallest corner gaps, moisture and particulate laden air infiltration into the solar collector interior will inevitably occur, urged by pressure differences between the air inside the solar collector and ambient air. Moisture and particulate intrusion eventually end up as a grimy film on the underside of the glazing, reducing solar energy transmittance. The corner joints discussed are seldom, if ever, sealed with an elastomeric material that might help prevent moisture intrusion over time. The lack of effective corner sealing is due in part to the practical difficulty of sealing the abrupt, planar and pointed surface intersections at the top and bottom of each corner joint. While the corner joints could be welded, this strategy imposes unacceptable labor costs and is incompatible with the most common frame material and finish, which comprises an anodized finish of an aluminum frame.

During severe windstorms, square corners on a solar collector increase dynamic pressure on the cover plate. Comparative tests of roof gravel scouring showed that aerodynamic corners can double the damage threshold wind speed compared to conventional square corners. Pressure measurements showed up to 75% reduction in uplift pressures in a roof corner test for an aerodynamic corner, when compared with a square corner. See Lin, et al., "Aerodynamic Devices for Mitigation of Wind Damage Risk," 4th International Conference on Advances in Wind and Structures. AWAS 08. Jeju, Korea, May 29-31, 2008.

A problem closely related to the wind uplift pressure issue discussed above is that any structure comprising a blunt windward edge with square corners promotes formation and shedding of vortex currents along the edges disposed downwind from such corners. See Okamoto, S. and Uemura, N. "Effect of rounding side-corners on aerodynamic forces and turbulent wake of a cube placed on a ground plane," Experiments in Fluids, 11, 58-64. Springer-Verlag. 1991.) If the frequency of the vortex shedding happens to match the resonance frequency of the structure, the structure will begin to resonate and the structure's movement can become self-sustaining Vortex shedding on a solar collector perimeter during a severe windstorm can literally shake roof shingles loose and start progressive undermining of the entire roof structure, leading to eventual catastrophic loss. Roof deck failure is the leading cause of catastrophic residential building damage during severe windstorms. Once a building loses one or more pieces of roof deck, damage increases exponentially as vast amounts of wind-driven water enter the structure. Insurance claim data show that damage escalates quickly once a roof deck starts to fail. Even if the walls remain intact and the roof trusses do not fail, loss of the roof deck typically results in losses greater than 50% of building insured value. See Applied Research Associates, Inc. "Development of Loss Relativities for Wind Resistive Features of Residential Structures," Florida Department of Community Affairs (DCA Contract 02-RC-11-14-00-22-003), Version 2.2, Mar. 28, 2002.

The evacuated tube solar collector is an alternative to the glazed flat plate solar collector. U.S. Pat. No. 4,067,315 to Fehlner and Ortabasi (1978) teaches an exemplary evacuated tube solar collector. The evacuated tubes of such solar collectors typically comprise 1.6 millimeter thickness borosilicate glass cylinders. While such glass cylinders do have a degree of impact resistance, breakage can nevertheless occur as a result of impacts by hail, wind-driven storm debris, errant golf balls and baseballs, and dropped tools. Breakage can also occur during shipping and handling.

Snow accumulation is also a problem for evacuated tube collectors. The vacuum that eliminates convective heat losses from inside the glass tube to ambient air also allows snow to accumulate on the glass tubes. The glass cover plate of a flat plate solar collector is warmed during sunny conditions by continual heat transfer from the hotter air on the underside of the glass to the cooler ambient air. However, the glass of an evacuated tube solar collector is only warmed by the small percentage of incident solar energy absorbed by the glass, and this heat is quickly lost to the cold ambient air that accompanies a snowfall. Thus, absent manual snow removal, evacuated tube solar collectors are rendered useless for some period of time after a snowfall.

Evacuated flat plate solar collectors have been proposed. U.S. Pat. No. 4,332,241 to Dalstein, et al. (1982), U.S. Pat. No. 7,810,491 to Benvenuti (2010) and U.S. Pat. No. 8,161,965 to Palmieri (2012) are exemplary designs. The Benvenuti '491 patent provides an excellent discussion of both tube and flat plate evacuated solar collectors. The Dalstein '241 patent teaches a complex double-walled frame, including an inner frame wall comprising four pieces of square tubing welded at 45-degree beveled sharp corners. The Dalstein '241, Benvenuti '491 and Palmieri '965 patents all teach various approaches to soldering or fusing metal to glass. These complex and relatively expensive processes are conceived to address the dissimilar materials and dissimilar rates of expansion and contraction of the glass cover plate and the metal frame walls. However, the Dalstein '241, Benvenuti '491 and Palmieri '965 patents do not solve the problems associated with flat plate solar collector glazing or sharp side wall corners, or the problem of snow accumulation on the outer glass surface of an evacuated solar collector.

The unglazed solar collector is another alternative to the glazed flat plate solar collector. Unglazed plastic solar collectors, with carbon black added to the plastic resin to enhance solar energy absorptance and combat the effects of prolonged exposure to ultraviolet radiation, are widely used for swimming pool heating. U.S. Pat. No. 3,934,323 to Ford, et. al. (1976) and U.S. Pat. No. 4,060,070 to Harter (1977) teach examples of unglazed plastic solar collectors. While swimming pool heating requires temperatures between 25° C. and 32° C., unglazed plastic solar collectors have been employed for potable water heating, which requires temperatures between about 45° C. and 60° C.

Unglazed solar collectors are capable of delivering 60° C. water when the flow rate of the working fluid is reduced. Unfortunately, though, unglazed solar collectors suffer much greater convective heat losses than glazed flat plate solar collectors when the ambient air temperature falls below the solar collector fluid inlet temperature. Wind compounds the problem. Poor cold weather performance is acceptable for solar swimming pool heating because the goal in most climates is only to extend the swimming season by a few extra months. Other water heating applications require hot water on a year-round basis.

BRIEF SUMMARY OF THE INVENTION

The present invention is directed to a solar collector comprising an opaque cover. Solar energy is absorbed by the opaque cover and converted to heat, which is transferred from the opaque cover by conduction, convection, and infrared emittance across a gap within an at least substantially airtight enclosure to an absorber containing a working fluid. The exterior surface of the opaque cover has high solar energy absorptance and the interior surface has high infrared emittance. The exterior surface preferably also has low infrared emittance. The composition, structure and thermal mass of the opaque cover and the composition, structure and thermal mass of the absorber are selected to promote an operating relationship whereby the interior surface of the opaque cover is hotter than the absorber surface.

One embodiment is directed to a solar collector comprising a continuous side wall having a hollow cross-section and rounded corners. The continuous side wall is economical to fabricate yet unusually strong compared to current art solar collector frame walls. The rounded corners of the continuous side wall reduce windload stresses during hurricane-force winds, which permits a reduced thickness of the opaque cover and can reduce potential catastrophic roof damage. The form and inherent strength of the continuous side wall also allow alternatives for reducing convective heat loss to the ambient air. In a most economical embodiment of a continuous side wall, convective heat loss is reduced by the dead air space in the hollow portion of the continuous side wall. In a second alternative embodiment, convective heat loss can be further reduced by injecting mass insulation, such as, for example, polyurethane foam, into the hollow portion of the continuous side wall. In a third alternative embodiment, the inherent strength of the continuous side wall and, in particular, the inherent strength of the rounded corners combine with the simplicity and ease of airtight sealing a solar collector of the present invention to permit evacuation of the solar collector interior. Evacuating the solar collector interior virtually eliminates convective heat losses.

In higher performance embodiments, the opaque cover preferably has a selective coating on the exterior surface with high solar energy absorptance and low infrared emissivity, and preferably has a coating on the interior surface with high infrared emissivity. The absorber preferably has a selective coating with high infrared absorptance.

While not wishing to be bound to a single theory as to the optimal structure for promoting heat transfer from the opaque cover to the absorber, one preferred embodiment is directed to a solar collector that achieves a greater absorber wetted surface exposed to infrared energy transfer by providing a spaced apart relationship above, below and between the fluid passageway tubes of the absorber, thereby providing for infrared energy transfer not only directly from the opaque cover to the absorber but also indirectly from a highly reflective surface below the absorber to the underside surfaces of the absorber.

DETAILED DESCRIPTION OF THE INVENTION

Figure 1:
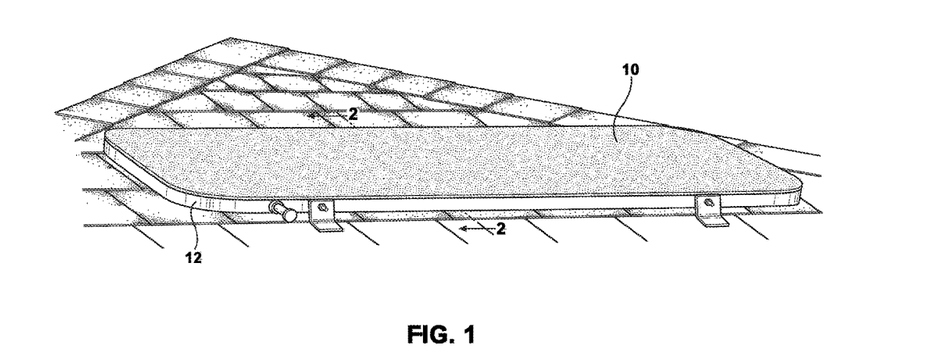
FIG. 1 illustrates an exterior perspective view of a prototype solar collector comprising one exemplary embodiment, installed on a roof.
Figure 2:
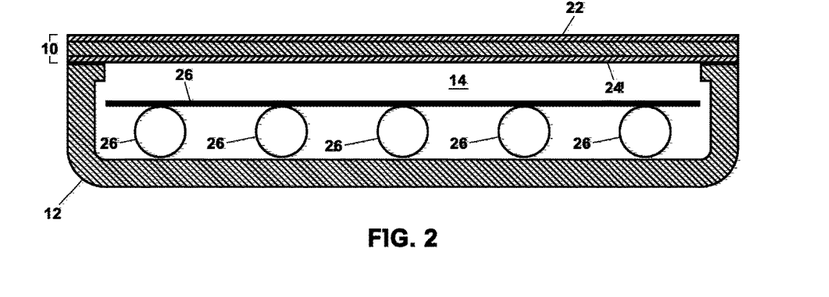
FIG. 2 illustrates a cross-sectional view of one basic embodiment of an opaque cover, a housing, and an absorber. The absorber configuration depicted is not critical to the invention.

Turning now to FIG. 1, the present invention is directed to a solar collector comprising an opaque cover 10 disposed to receive incident solar energy and coupled to an upper portion of a housing 12. A cross-sectional view of one embodiment, taken at section line 2-2 of FIG. 1, is illustrated in FIG. 2. The opaque cover 10 preferably comprises a planar structure but can also be dome-shaped, corrugated, or any other shape suitable for receiving incident solar energy and providing for structural integrity under anticipated loads. The housing 12 may be of any shape and construction suitable to isolate an absorber 26 from ambient air, provided that coupling of the opaque cover 10 to an upper portion of the housing 12 defines an at least substantially airtight enclosure 14. The absorber 26 is disposed within the enclosure 14 in an opposing spaced apart relationship with the opaque cover 10.

The present invention is directed to a solar collector that operates by a fundamentally different principle than glazed flat plate solar collectors of the current art. Instead of transmitting incident solar energy through a transparent or translucent glazing material, the opaque cover 10 absorbs solar energy at its exterior surface 22, the absorbed radiant energy heats the opaque cover 10, then, in addition to any heat transfer from the opaque cover 10 to the absorber 26 via conduction or convection, infrared energy is emitted from the interior surface 24 to the absorber 26. The exterior surface 22 has solar energy absorptance greater than 0.80 and the interior surface 24 has infrared emittance greater than 0.80. For improved thermal performance, the exterior surface 22 preferably has infrared emittance of less than 0.30.

In a single-glazed, flat plate solar collector circulating a working fluid at temperatures of 40-60° C., the glass cover plate temperature is about 50-70% of the absorber mean surface temperature. In stark contrast to a glazed flat plate solar collector, the interior surface 24 of the opaque cover 10 is hotter than the absorber 26 during normal operation, which facilitates net radiant energy transfer from the opaque cover 10 to the absorber 26. Without being bound to any particular theory, it is believed that the temperature of the interior surface 24 of the opaque cover 10 should preferably be as hot as possible during normal operation because infrared emittance increases to the fourth power of the temperature of an emitting surface. The temperature of the interior surface 24 can be maximized by material selection and thickness directed to high thermal conductivity and low thermal mass such as, for example, an interior surface 24 comprising a 0.813 millimeter thickness aluminum sheet.

Figure 3A:
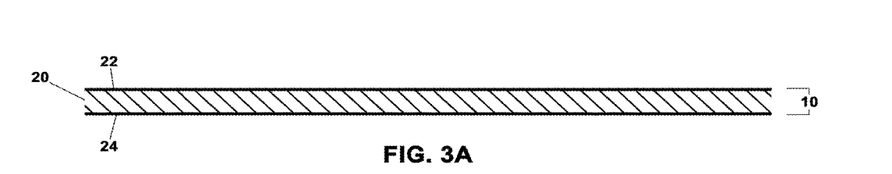
FIGS. 3A, 3B, 3C, 3D and 3E illustrate cross-sectional views of several exemplary embodiments of an opaque cover of the present invention.

The opaque cover 10 can employ a variety of strategies to meet a range of performance goals and cost considerations. FIG. 3A illustrates a basic embodiment of the opaque cover 10 comprising a central region 20, the exterior surface 22, and the interior surface 24 as a homogeneous structure and composition. One exemplary homogeneous opaque cover 10, directed to low cost, comprises a molded polymer structure incorporating carbon black in the resin. Such a composition has high absorptance at the exterior surface 22 and high emissivity at the interior surface 24. While emissivity of the exterior surface 22 in this example is undesirably high, the reduction in performance can be acceptable for an embodiment of the present invention directed primarily to a very low cost solar collector.

Figure 3B:
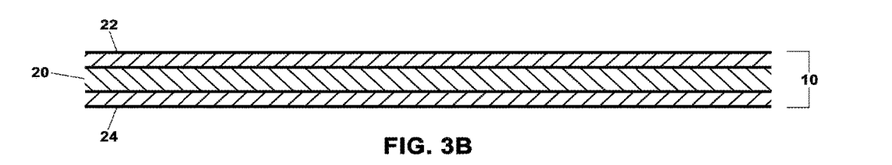

FIG. 3B illustrates an embodiment of the opaque cover 10 wherein each of the exterior surface 22 and the interior surface 24 comprises a selective coating. The term "selective coating" as used herein refers to paints, plating, resins, sheets, laminates, films, vacuum deposited metals, and other coatings that increase or reduce the radiant energy absorptance of a surface, increase or reduce the radiant energy reflectance of a surface, increase or reduce the radiant energy emittance of a surface, deliver a preferred range of absorptance and emittance, or deliver a preferred range of the ratio of absorptance to emittance. Exemplary selective coatings include oxides of titanium nitride or other metals, anodized aluminum, black chromium electroplated over a nickel substrate, ceramic matrices, quartz-encapsulated bi-metallic alloys, layered compositions of silicone polymers and metal oxides, black lacquer, urethane paints, silicone paints, compositions of polypropylene polymers and carbon black, compositions of butyl or EPDM rubber incorporating carbon black, and individual sheets or multilayer stacks of polymer films such as, for example, stacks of transparent cross-stretched birefringent sheets.

In embodiments comprising selective coatings, the exterior surface 22 is preferably selective for enhanced absorption of incident solar energy and reduced emittance of infrared energy, and the interior surface 24 preferably has high infrared emittance. A variety of commercial selective coatings are available that offer solar energy absorptivity ranging from 0.90 to 0.96, with simultaneous infrared emissivity ranging from 0.05 to 0.30. The selection of selective coatings can be based upon cost and thermal performance targets. In an exemplary low cost embodiment, a selective coating for the exterior surface 22 might have absorptivity of 0.87 and emissivity of 0.90; while an exemplary high thermal performance embodiment might have absorptivity of 0.95 and emissivity of less than 0.30.

The central region 20 of the opaque cover 10 can be solid such as, for example, a sheet of aluminum, molded polymer, fiberglass, or carbon fiber or, alternatively, comprise a complex structure such as, for example, a honeycomb sandwich structure having honeycomb core walls disposed in a perpendicular sandwiched relationship between each of the exterior surface 22 and the interior surface 24. In such a honeycomb sandwich structure, each of the exterior surface 22 and the interior surface 24 comprise facing sheets such as, for example, aluminum sheets having selective coatings applied on the sides distal to the honeycomb core walls. The honeycomb sandwich structure combines high compressive strength and weight savings. Further, the honeycomb sandwich structure reduces convective heat loss by providing air spaces within the honeycombs that dampen convection because of very low volume. While a honeycomb sandwich structure reduces convective heat loss, energy transfer via direct infrared energy emittance from the exterior surface 22 to the interior surface 24 across the air spaces in the honeycombs is enhanced by conduction via thermal bridging through the honeycomb core walls, which are in direct contact with each of the exterior surface 22 and the interior surface 24. Alternatively, the air spaces in the honeycomb structure may be filled with material having thermal conductivity less than 2 W/m ° C. at 25° C. or greater than 15 W/m-° C. at 25° C.

Figure 3C:
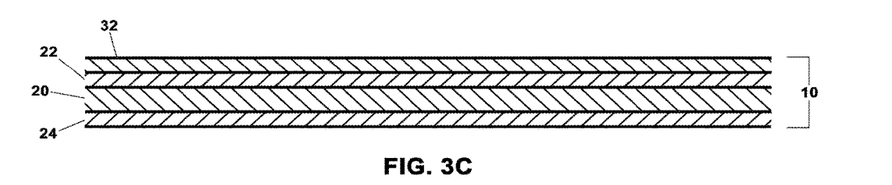

The exterior surface 22 of the opaque cover 10 is directly exposed to the ambient air. Atmospheric moisture generally and acidic rain in particular can attack some selective coatings by wet corrosion. If the exterior surface 22 comprises a selective coating susceptible to wet corrosion, it is advantageous to apply a transparent protective coating 32 over the selective coating as illustrated in FIG. 3C. The transparent protective coating 32 can be a simple transparent "hardcoat" layer or a multilayer polymer stack film that further comprises adhesive or polymer layers spectrally selective to reflect ultraviolet wavelengths. It is well known in the art of polymer films for sun control that adhesives having additives to selectively absorb ultraviolet radiation, or film sheets that selectively reflect ultraviolet radiation, can be placed in a layer proximal to a surface receiving incident solar energy to enhance longevity of both the stack and structures and surfaces for which sun control is sought.

As disclosed above, the interior surface 24 of the opaque cover 10 preferably has high emittance of infrared energy. Since the interior surface 24 is preferably hotter than the absorber 26 during normal operation, absorptance by the interior surface 24 of infrared energy reradiated from the absorber 26 is not believed to be a significant concern. Many coatings, such as, for example, black paints (including compositions comprising silicones and urethanes), and paint, plastic, acrylic, and rubber compositions incorporating carbon black combine economy, durability, and high emissivity. See Clatterbuck, Caroll H. and Scialdone, John J. "NASA Technical Memorandum 100768: An Evaluation of Two Flat-Black Silicone Paints for Space Application," National Aeronautics and Space Administration, Goddard Space Flight Center, Greenbelt, Md., December 1990, for an overview of high emissivity paints. Any film applied to the interior surface 24 will have enhanced longevity due to the absence of exposure to ultraviolet radiation.

Figure 3D:
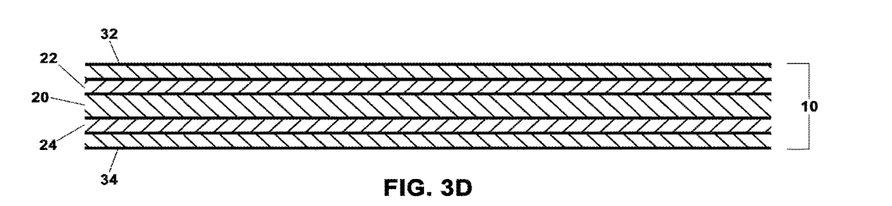

FIG. 3D illustrates another alternative embodiment of the present invention comprising a transparent layer 34 applied to the interior surface 24 of the opaque cover 10. The transparent layer 34 has selective reflectivity in the infrared wavelengths. An exemplary transparent layer 34 comprises a cross-stretched stack of birefringent polymer film sheets. It should be noted that such cross-stretched stacks are available in assembled form such as, for example, multilayer optical films manufactured by 3M.

Figure 3E:
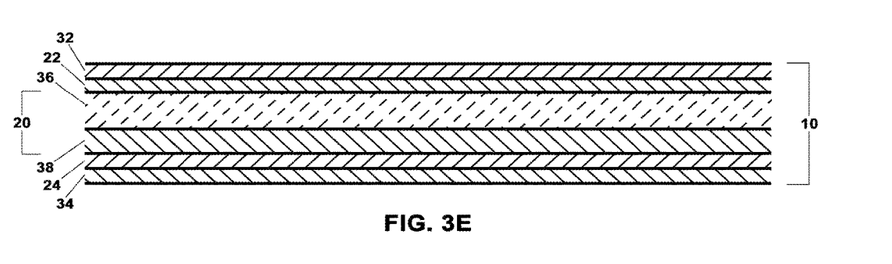

As disclosed above, the temperature of the interior surface 24 is preferably as hot as possible during normal operation. In stark contrast, the temperature of the exterior surface 22 is preferably as cool as possible to reduce both infrared energy emittance to the sky and convective heat loss to the ambient air. Such an ideal differential relationship is difficult to achieve in practice. However, FIG. 3E illustrates yet another alternative embodiment of the present invention comprising a laminated structure of the opaque cover 10 that minimizes convective heat loss from the exterior surface 22 while simultaneously maximizing the temperature and consequent infrared energy emittance of the interior surface 24 by employing different materials for an exterior layer 36 and an interior layer 38 of the central region 20. For example, and in addition to selective coatings and protective or reflective coatings comprising the exterior surface 22 and the interior surface 24, the exterior layer 36 comprises an insulating layer with low thermal conductivity and the interior layer 38 comprises a layer with high thermal conductivity. The insulating aspect of the exterior layer 36 can be further enhanced by high thermal mass. The high thermal conductivity aspect of the interior layer 38 can be further enhanced by low thermal mass. Without being bound to any particular theory, it is believed that the insulating exterior layer 36 of the exemplary laminated structure, while reducing convective heat loss, only minimally impacts conductive heat transfer of absorbed solar energy to the interior surface 24 because the insulating aspect of the exterior layer 36 increases not only resistance to convective heat loss at the exterior surface 22 but also the thermal capacitance of the opaque cover 10.

The alternative embodiments of the opaque cover 10 disclosed above are intended to be merely illustrative examples and not exhaustive. Within the scope of the present invention, many more materials, alternative combinations of the various aspects, and modifications in addition to those described above are possible without departing from the inventive concepts disclosed.

Figure 6:
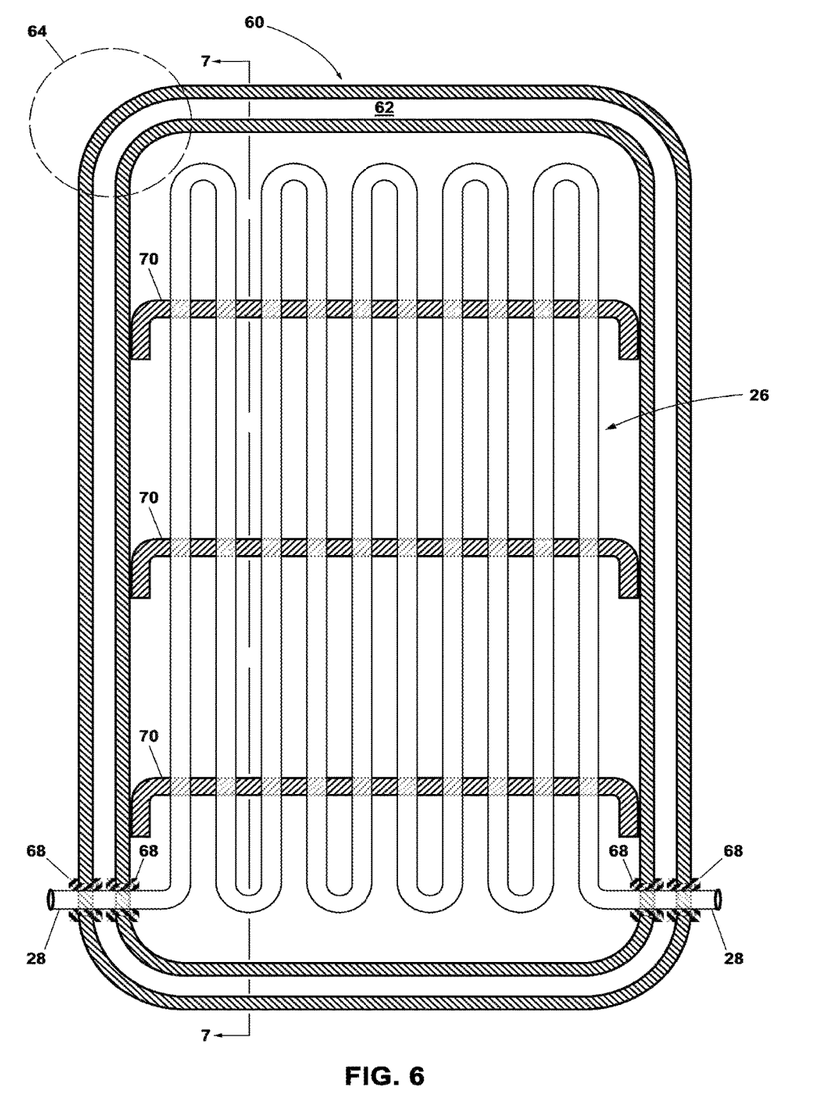
FIG. 6 illustrates a bird's-eye view of an embodiment directed to a continuous side wall, with the opaque cover removed to reveal the continuous side wall and a plurality of transverse frames. The specific configuration of the generic absorber structure depicted is not critical to the invention.

The absorber 26 is disposed within the enclosure 14 in an opposing spaced apart relationship with the opaque cover 10. At least inlet and outlet conduits 28, shown in FIG. 6, are provided to supply and extract, respectively, the working fluid to and from the solar collector. The specific design, flow configuration, and construction aspects of the absorber 26 and conduits 28 are not critical. The present invention can be used with any absorber design, including absorbers comprising, for example, integral storage, fin structures, opposing and generally planar sheets joined to define a vessel, serpentine (serial) or harp (parallel) interconnected tubes, heat pipes, and air ducts, so long as the interior surface 24 of the opaque cover 10 is hotter than the surface of the absorber 26 during normal operation. In one alternative embodiment comprising integral storage for the working fluid, the integral storage capacity of the absorber 26 is preferably between 20 and 100 liters per square meter of planar surface area of the opaque cover 10.

The preferred differential temperature relationship of the interior surface 24 and the absorber 26 can be enhanced by increasing the ratio of wetted surface area of the absorber 26 to the total planar surface area of the opaque cover 10 exposed to incident infrared energy. A higher wetted surface area of the absorber 26 allows the working fluid to more completely cool the absorber 26 as heat is extracted therefrom and transferred into the working fluid. The absorber 26 may also be alternatively or further cooled by selection of an absorber 26 material with lower thermal conductivity, especially in combination with a fully wetted surface of the absorber 26 because thermal conductivity is not critical to radiant energy transfer.

Figure 4:
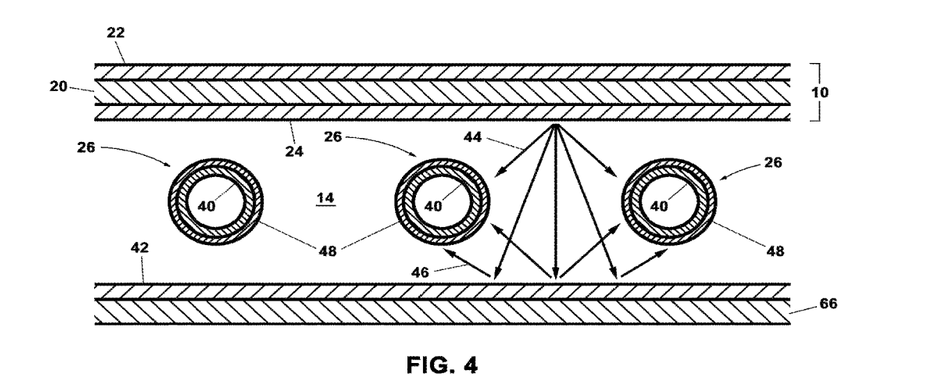
FIG. 4 and FIG. 5 illustrate cross-sectional views showing three exemplary fluid passageway tubes of one preferred embodiment comprising an absorber having fluid passageway tubes in a spaced apart relationship.

FIG. 4 illustrates one preferred embodiment wherein the absorber 26 comprises fluid passageway tubes 40 without fins, in a spaced apart relationship with a highly reflective surface 42 disposed beneath the tubes. Infrared energy first emitted 44 from the interior surface 24 of the opaque cover 10 that passes between the tubes 40 of the absorber 26 can be reflected 46 back to the undersides of such tubes 40. The highly reflective surface 42 may be a sheet of unpolished or polished aluminum, an aluminum foil, a reflective paint composition, or a polymer or metalized polymer film spectrally reflective for infrared wavelengths.

Figure 5:
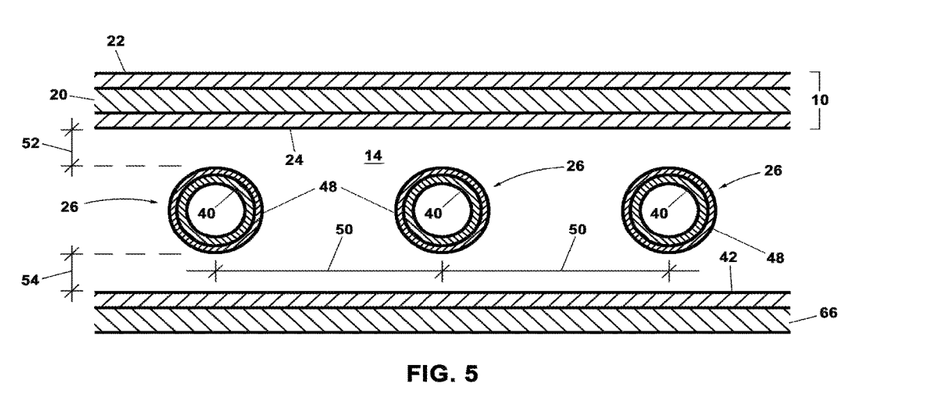

Infrared energy emitted from a planar surface is diffuse. Accordingly, the spaced apart relationship of the tubes 40 and reflective surface 42 exposes the full 360-degree circumference of each tubes 40 to infrared energy first emitted 46 by the interior surface 24 of the opaque cover 10. Further, as illustrated in FIG. 5, when the average centerline spacing 50 of parallel aligned tubes 40 is between 0.75 and 1.00 times the average circumference of a tube 40, total circumferential outer surface area of the tubes can approximate 100% of the planar surface area of the opaque cover 10. In another aspect, the full 360-degree circumference of each fluid passageway tube 40 and the full 360-degree circumference of any connecting U-bends, or manifold structures in a parallel flow configuration, preferably have a coating 48 with high absorptance. Alternatively, high absorptance may be incorporated into a polymer absorber 26 such as, for example, by incorporating carbon black in the polymer resin. The selective coating 48 preferably has infrared absorptance greater than 0.90.

The spaced apart relationship of the absorber 26 and the opaque cover 10 preferably defines a gap 52 of at least 3 millimeters, and the spaced apart relationship of the absorber 26 and the highly reflective surface 42 preferably defines a gap 54 of at least 3 millimeters. In one preferred alternative embodiment of the present invention, the spaced apart relationships between the absorber 26 and the opaque cover 10 and between the absorber 26 and the highly reflective surface 42 are enabled by a plurality of transverse frames 70, which are illustrated in FIG. 6 and more fully described below.

The disclosed fully wetted surface geometry is less expensive and involves less material than a nominally fully wetted surface absorber comprising the same material, tube diameter and wall thickness, either without spacing between fluid passageway tubes or with substantially less spacing between fluid passageway tubes.

A wide variety of absorber structures and materials can be employed. The fluid passageway tubes 40 can be copper, bent or brazed to U-shaped copper fittings to create a serpentine (serial) fluid flow pattern. Alternatively, substantially parallel aligned copper tubes 40 may be brazed to copper header manifold tubes, creating a parallel flow pattern. Tubes 40 can also be aluminum. Aluminum is less expensive than copper, even where a greater tube 40 wall thickness is required for a given fluid pressure, to compensate for the lower tensile strength of aluminum. Aluminum has excellent formability characteristics for bending and is lighter and less expensive than copper. Copper has higher thermal conductivity than aluminum but the difference is trivial in an absorber 26 comprising a 100% wetted surface, where radiant heat transfer is a significant component of total heat transfer.

The interconnected fluid passageway tubes 40 of the absorber 26 can also be a plastic tubing such as, for example, polypropylene or cross-linked, high density polyethylene ("PEX") tubing, or a PEX-AL-PEX variant wherein the tube 40 walls comprise an aluminum layer sandwiched between PEX inner and outer layers. Any alternative tube 40 material selected should be capable of withstanding stagnation temperatures associated with the particular convective heat loss control strategy employed (e.g., dead air space, mass insulation, or evacuation). For example, PEX tubing would not be suitable in an embodiment directed to an evacuated solar collector, or in embodiments comprising mass insulation. The tubes 40 can also be a synthetic rubber such as, for example, ethylene propylene diene monomer ("EPDM") rubber, which has a higher operating temperature range than PEX tubing provided; however, that EPDM rubber may not be suitable where potable water containing chlorine will circulate through the absorber 26. It should be noted that the present invention is directed to a solar collector wherein all materials and surface coatings of the absorber 26 are protected from exposure to ultraviolet radiation by the opaque cover 10, which is not the case in glazed flat plate and evacuated tube solar collectors.

FIG. 6 illustrates a birds-eye view of one embodiment of the present invention directed to a solar collector comprising a continuous side wall 60 having a hollow cross section 62 and rounded corners 64. Transverse frames 70 support the absorber 26 and create the spaced apart relationship between the absorber 26 and the opaque cover 10 (not shown), between the absorber 26 and the continuous side wall 60, and between the absorber 26 and a back plate 66 (not shown). The generic absorber 26 structure illustrated in FIG. 6 is not critical to the invention. The outside surface radius of each rounded corner 64, which outside surface is exposed to ambient air, is preferably at least 8 centimeters.

Figure 7A:
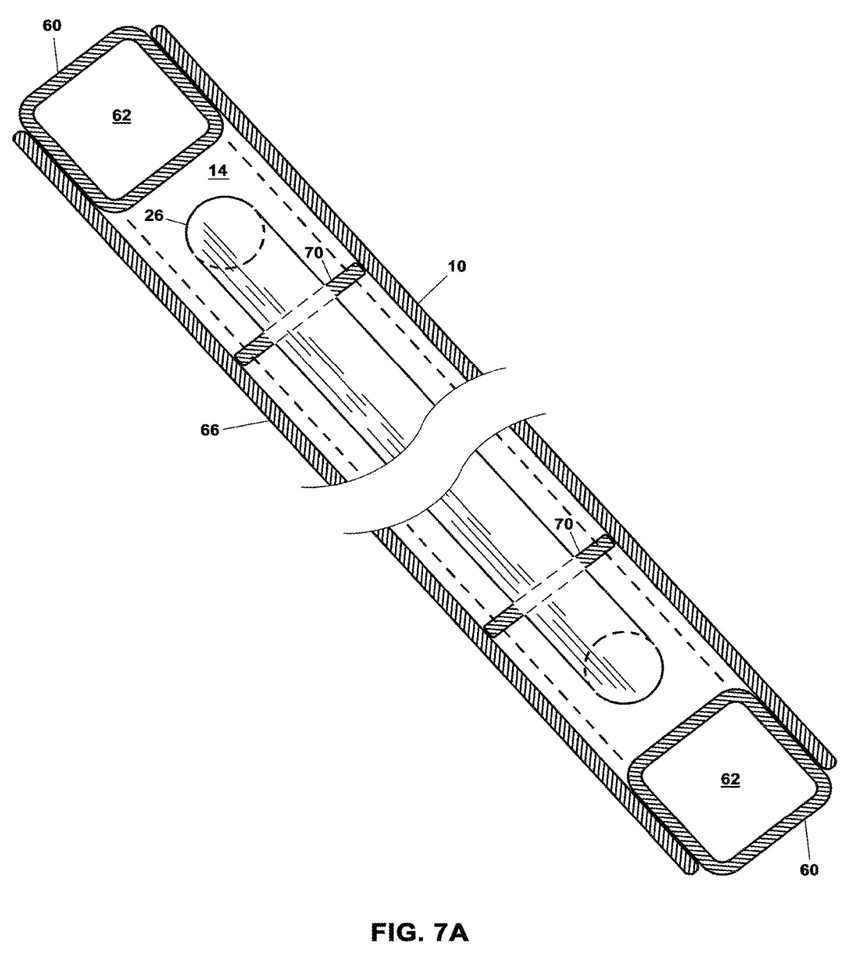
FIGS. 7A, 7B and 7C illustrate cross-sectional views of various embodiments comprising a continuous side wall and transverse frames. The generic absorber depicted is not critical to the invention and is shown only to illustrate a spaced apart relationship between the absorber and the opaque cover, between the absorber and the continuous side wall, and between the absorber and the back plate.
Figure 7B:
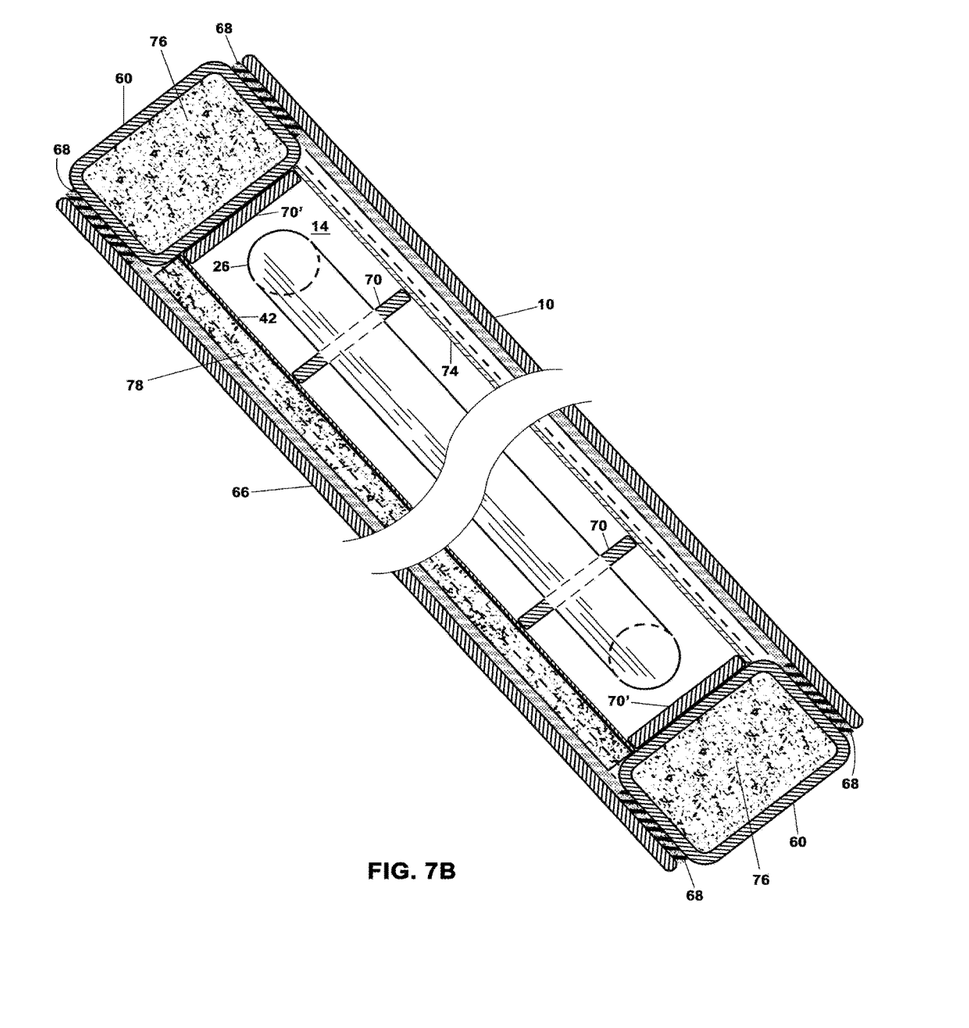
Figure 7C:
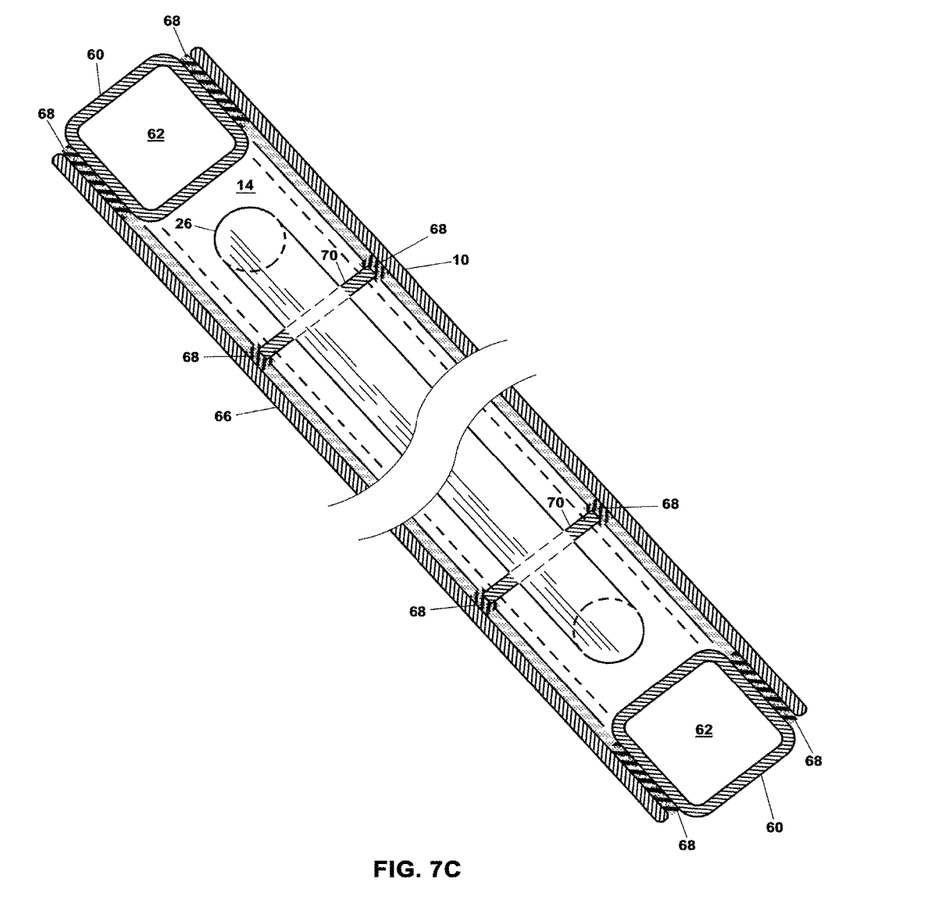

A cross-sectional view taken at section line 7-7 of FIG. 6 is illustrated in FIG. 7A. The opaque cover 10 is coupled to an upper portion of the continuous side wall 60 and a back plate 66 is coupled to a lower portion of the continuous side wall 60. The continuous side wall 60, the opaque cover 10, and the back plate 66 define an enclosure 14. The method of coupling, which may comprise fasteners, adhesives, brackets or parts that snap together by the temporary deformation of one or more mating surfaces, is not critical to the invention. However, it is preferable to provide a coupling method whereby the opaque cover 10 can be removed and replaced, for inspection and servicing of the absorber 26, without causing permanent damage or deformation. It is also preferable that the method of coupling promote preservation of the at least substantially airtight character of the enclosure 14 over the anticipated service life of the solar collector. A gasket material 68 may be interposed at the contact perimeter between the continuous side wall 60 and the opaque cover 10, and at the contact perimeter between the continuous side wall 60 and the back plate 66, to provide a seal that serves to reduce the intrusion of moisture, dirt, and particulates into the enclosure 14. The contact perimeter gasket material 68 is illustrated in FIGS. 7B and 7C. The contact perimeter gasket material 68 may be eliminated in alternative embodiments directed to low manufacturing cost.

Alternative embodiments of the continuous side wall 60 can be formed of extruded plastic, shaped composites, or other suitable materials. In one preferred embodiment, a single piece of hollow aluminum square tube is bent within a rotary compression bending machine to form rounded corners 64 of a generally rectangular continuous side wall 60. For example, a 6 meter×25 millimeter square piece of 1.575 millimeter gauge thickness 6063-T52 aluminum square tube can be bent to form a continuous side wall 60 measuring approximately 0.61 meters×2.44 meters with about 8 centimeter radius rounded corners, the radius being measured at the outside exterior surface of the aluminum square tube. Exemplary rotary compression bending machines are manufactured by Pedrick Tool and Machine Company of Cinnaminson, N.J. The two ends of the square tube are welded and smoothed at a single point along a remaining straight section of the square tube, to form the continuous side wall 60 without corner joints.

Holes can be drilled through the continuous side wall 60 to accommodate fluid inlet and outlet passageways, for fitting ancillary devices or mounting hardware, and for injecting foam insulation into the hollow cross-section 62. It is also noteworthy that some holes, such as, for example, holes for mounting hardware or for injecting foam insulation, may only penetrate the exterior portion of the continuous side wall 60, advantageously limiting the number of penetrations through the interior portion of the continuous side wall 60 for the purposes of convective heat loss reduction an, in an evacuated solar collector embodiment, vacuum preservation. Steps unrelated to the bending operation such as, for example, drilling holes in the continuous side wall 60, can be performed prior to the bending operation. This advantageously allows such unrelated tasks to be performed on straight stock of different lengths at the same work station. Thus, a space-efficient work station arrangement can be employed for processing straight stock for solar collectors of varying sizes. It is not necessary to have a different workstation for the non-bending operations associated with fabricating each different size of the continuous side wall 60.

The structure and composition of the opaque cover 10 are determined in part by the anticipated dynamic air pressures to which the solar collector may be subjected. In this regard, the rounded corners 64 reduce dynamic air pressure on the opaque cover 10 during high winds. Consequently, the opaque cover 10 can have less mass than might otherwise be required under a given windload requirement. In addition to material cost savings, an opaque cover 10 with reduced mass will generally attain higher temperatures when exposed to incident solar energy, which is desirable for increasing infrared heat transfer to the absorber 26.

The transverse frames 70 will now be discussed in greater detail. As discussed above, one embodiment of the present invention is directed to a solar collector comprising the absorber 26 supported within the enclosure 14 by transverse frames 70. The transverse frames 70 position the absorber 26 such that a spaced apart relationship is created between the absorber 26 and each of the opaque cover 10, the continuous side wall 60, and the back plate 66. The transverse frames 70 are preferably seated against the interior walls of the continuous side wall 60, as illustrated in FIG. 6. In embodiments wherein the transverse frames 70 are the same height as the continuous side wall 60, the transverse frames 70 can float freely or can be rigidly coupled to the continuous side wall 60. The transverse frames 70 preferably comprise 90-degree bends or extruded "I-beam" sections at each end, to provide mating surfaces for the continuous side wall 60 and added strength against deformation by external loads.

Figure 8:
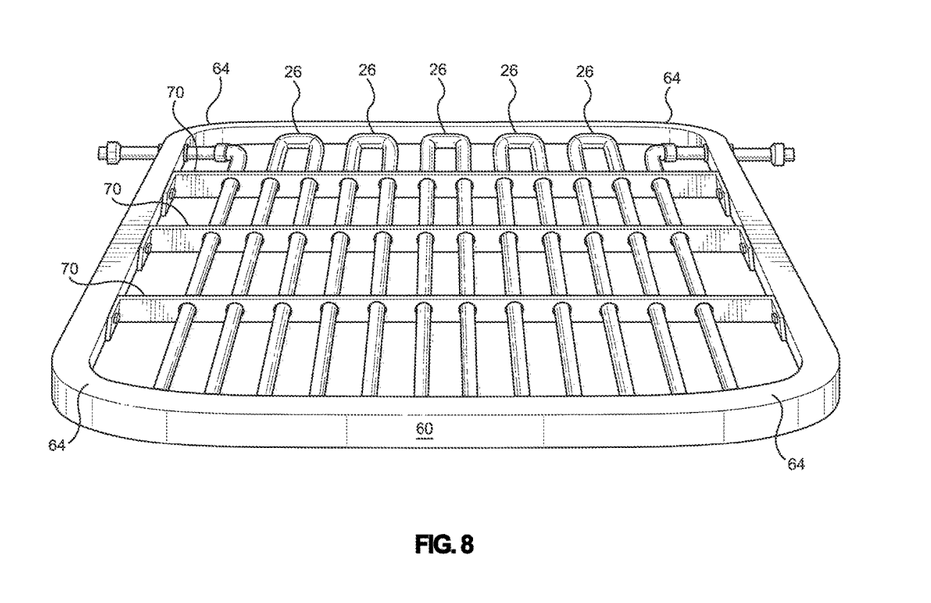
FIG. 8 illustrates a perspective view of one preferred embodiment with the opaque cover and back plate removed to reveal the continuous side wall having rounded corners, the transverse frames, and an absorber having substantially parallel fluid passageway tubes in a spaced apart relationship.

FIG. 8 illustrates a perspective view of one embodiment of the present invention with the opaque cover 10 and the back plate 66 removed to reveal the continuous side wall 60, transverse frames 70, and an absorber 26 having substantially parallel fluid passageway tubes 40 in a spaced apart relationship.

The transverse frames 70 perform a variety of functions. In a first aspect, the transverse frames 70 isolate the absorber 26 from contact with interior surfaces of the opaque cover 10 and the housing 12, reducing the potential for conductive heat loss and promoting radiant energy transfer, which requires a spaced apart relationship between opposing, radiant energy exchanging surfaces. In a second aspect, the transverse frames 70 reduce potential convective heat transfer within the enclosure 14 by separating the enclosure 14 into a plurality of smaller spaces, which reduces the potential temperature differences within upper and lower portions of each such smaller space (temperature difference in a fluid is the driver of natural convection). In an alternative embodiment of the present invention comprising an evacuated solar collector, the transverse frames 70 provide interior structural support against compressive forces applied by atmospheric pressure to the opaque cover 10 and the back plate 66. The opaque cover 10 and the back plate 66 may each be rigidly coupled to the transverse frames 70 to help resist the dynamic pressures associated with hurricane force winds, an option that is not practical with sheet glass. Alternatively, the transverse frames 70 may not be rigidly coupled to any portion of the opaque cover 10, the continuous side wall 60, or the back plate 66, and are instead held in a fixed position by ridges or indentations in the opaque cover 10, the continuous side wall 60, and the back plate 66, or by an alternative combination thereof. Each transverse frame 70 may comprise two parts: an upper portion and a lower portion, to facilitate placement of the absorber 26 during assembly of the solar collector. The precise number of transverse frames 70 is not critical to the invention, but rather is based upon the structural requirements of a particular solar collector model. Such requirements include, for example, the maximum unsupported spans possible for a particular combination of material, thickness, and construction of each of the opaque cover 10 and the back plate 66, and the maximum unsupported length of fluid passageway tubes 40 possible without deformation of the fluid passageway tubes 40 to a degree that would reduce infrared reflectance from the highly reflective surface 42 to the undersides of the fluid passageway tubes 40.

The transverse frames 70 may be selected from a variety of materials based upon factors such as, for example, ease of machining and forming, cost, service temperature range, strength, weight, and strength-to-weight ratio. Two such exemplary materials include aluminum and carbon fiber. It is desirable to isolate the transverse frames 70 from the absorber 26 (e.g., with butyl or EPDM rubber rings, or a non-metallic coating) where the absorber 26 and the transverse frames 70 are different metals or comprise different metals and metallic coatings, to reduce galvanic corrosion potential. In one embodiment, at least the portions of the transverse frames 70 in direct contact with the absorber 26 may comprise an insulating material to prevent thermal bridging from the absorber 26 to the opaque cover 10, to the continuous side wall 60, or to the back plate 66, via the transverse frames. Alternatively, transverse frames 70 with high thermal conductivity may be coated or isolated with an insulation.

Exemplary Convective Heat Loss Reduction Strategies

For embodiments comprising an air-filled space between the opaque cover 10 and the absorber 26, it would be advantageous to provide alternative and combination strategies for reducing convective heat loss to ambient air, especially during cold weather operation. As disclosed above, convective heat loss through the opaque cover 10 can be reduced with each of the honeycomb or laminated sandwich structures previously disclosed. Alternatively, or in combination with such structures, the gap 52 between the opaque cover 10 and the absorber 26 can be divided with a transparent planar sheet 74 in a parallel spaced relationship with the opaque cover 10, as illustrated by FIG. 7B. One exemplary planar sheet would be a thin film of PTFE. The transparent planar sheet 74 is preferably disposed in a spaced apart relationship at least about 3 millimeters apart from each of the opaque cover 10 and the absorber 26. In one exemplary configuration, the transparent planar sheet 74 is stretched across the upper surfaces of the transverse frames 70 and either adhered to transverse frames 70' or pinned between transverse frames 70' and the transverse portions of the continuous side wall 60. It should be noted that the durability and longevity of a polymer film such as, for example, PTFE, will be significantly increased in a solar collector of the present invention because the polymer film will not be exposed to ultraviolet radiation, in stark contrast to such a polymer film deployed in a current art glazed flat plate solar collector. FIG. 7B also illustrates foam insulation 76, which can be injected into the hollow cross-section 62 of the continuous side wall 60, and mass insulation 78 such as, for example, rock wool or a closed cell polyisocyanurate board, which can be disposed between the back plate 66 and the lower portions of the transverse frames 70. In alternative embodiments comprising mass insulation 78, the highly reflective surface 42 may be foil facing, reflective paint, or aluminum sheet applied, adhered to, or loosely coupled to the mass insulation 78 on the side proximal to the absorber 26. The highly reflective surface 42 may also comprise a planar sheet disposed between the mass insulation 78 and the lower portions of the transverse frames 70.

Convection currents within a closed and heated air space increase with the depth of the air space. For example, heated air spaces tend to have few if any convection currents up to a depth of 1.25 centimeters. A dead air space (in other words, a space with no meaningful convection currents) reduces convective heat transfer. Thus, for cold climate operation, it might be preferable to limit the air gap between the opaque cover 10 and the transparent planar sheet 74 to a depth of less than 1.25 centimeters.

Exemplary Evacuated Solar Collector Embodiments

The inherent strength of the disclosed hollow, continuous side wall 60 with rounded corners 64 is well suited for an embodiment comprising an evacuated flat plate solar collector. Further, the absence of abrupt corner joints in the continuous side wall 60 results in a solar collector wherein the only coupled perimeter surfaces are easily sealed, two-dimensional planar surfaces between the continuous side wall 60 and the opaque cover 10, and between the continuous side wall 60 and the back plate 66.

In an alternative embodiment of the present invention directed to an evacuated solar collector, it would be advantageous for the opaque cover 10, continuous side wall 60, and back plate 66 to have similar coefficients of expansion, thus eliminating the longstanding technical issues of dissimilar rates of expansion and contraction of a glass cover plate and metal side walls, and the related difficulty of achieving a durable vacuum seal between the dissimilar materials of flat plate evacuate solar collector glass cover plates and metal side walls. The opaque cover 10, continuous side wall 60, back plate 66, and transverse frames 70 of an evacuated embodiment of the present invention may be formed of metals, carbon fiber, ceramics, plastics, silicates, laminates, composites, and combinations thereof, it being preferred that structures employed in longitudinally coupled relationships, such as, for example, the opaque cover 10 and continuous side wall 60, have substantially similar coefficients of expansion.

The material composition, structure and thickness of the opaque cover 10, continuous side wall 60, back plate 66 and transverse frames 70 of an evacuated embodiment are preferably selected to withstand external atmospheric compressive forces when the vacuum pressure inside the evacuated airtight enclosure is less than about one torr, in an alternative embodiment of an evacuated solar collector that effectively eliminates convective heat losses; and preferably less than about $10^{-2}$ torr, and more preferably less than about $10^{-4}$ torr, in an alternative embodiment of an evacuated solar collector that effectively eliminates both convective and conductive heat losses.

In another aspect of an evacuated solar collector, it is advantageous to provide a gasket material 68 for airtight sealing of the contact perimeter between the opaque cover 10 and the continuous side wall 60, the contact perimeter between the continuous side wall 60 and the back plate 66, and within each opening through the airtight enclosure. A variety of suitable gasket materials may be provided such as, for example, silicone, PTFE, butyl rubber, or EPDM rubber. In particular, butyl rubber has excellent characteristics as a gasket material for sealing an airtight vacuum enclosure. Even very high-grade butyl rubber gasket seals manufactured to aerospace standards for human spaceflight will likely be more economical and more easily maintainable than the complex methods and structures proposed in the current art for soldering or fusing metal ribbons or skirts to glass cover plates.

Figure 9:
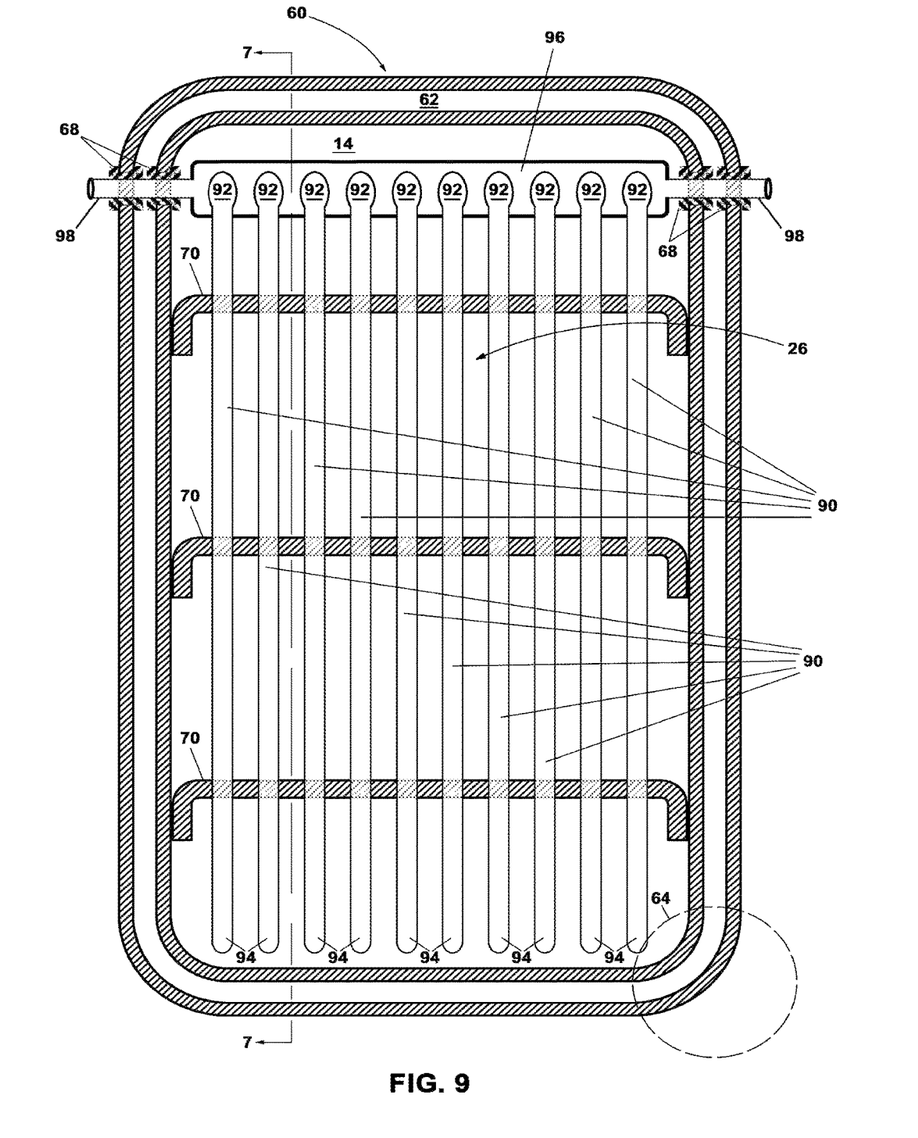
FIG. 9 illustrates a bird's-eye view of an exemplary embodiment directed to an evacuated solar collector comprising a plurality of heat pipes connected to an internal heat exchange manifold.

FIG. 9 illustrates one alternative embodiment of the present invention directed to an evacuated solar collector, wherein the solar collector is mounted at a non-horizontal angle of at least 10 degrees, and more preferably at least 20 degrees, and the absorber 26 comprises a plurality of parallel aligned heat pipes 90 wherein the condenser end 92 of each heat pipe 90 is elevated above the evaporator end 94. A horizontal heat exchange manifold 96 containing a second fluid is disposed inside and within the uppermost region of the enclosure 14, which is airtight and evacuated. The condenser end 92 of each heat pipe 90 is coupled in a heat exchange relationship with the heat exchange manifold 96, and conduits 98 are provided at each end of the heat exchange manifold 96 to supply and extract, respectively, the second fluid to and from the solar collector. The number of heat pipes 90, and the specific materials, designs and construction of the heat exchange manifold 96, the heat pipes 90, and any ancillary devices for vacuum loss detection, stagnation temperature control, or relief and restoration of the vacuum are not critical to the invention, so long as the interior surface 24 of the opaque cover 10 is hotter than the surface of the absorber 26 during normal operation. Further, the specific steps and parameters of any baking process to reduce future outgassing of materials inside the solar collector are not critical to the invention. However, in one preferred alternative embodiment consistent with FIGS. 4 and 5 and the associated detailed description therefor, the heat pipes 90 do not have fins, the full 360-degree circumference of each heat pipe 90 preferably has a selective coating with high absorptance and low emittance, and the heat pipes 90 are substantially parallel aligned in the spaced apart relationship of the fluid passageway tubes 40 in FIGS. 4 and 5 and the associated detailed description therefor. In sharp contrast to evacuated tube solar collectors of the current art, this configuration places the critical heat transfer connections between the heat pipes 90 and the heat exchange manifold 96 inside an evacuated airtight enclosure. Consequently, the substantial mass insulation typically required for a heat exchange manifold external to an evacuated tube of the current art is eliminated, and convective heat losses at the portion of the heat pipe disposed between the evacuated tube and the external heat exchange manifold, and from the heat exchange manifold, are virtually eliminated and greatly reduced, respectively.

Exemplary Low Cost Solar Collector Embodiments

The present invention can be directed to very low cost embodiments. For example, the opaque cover 10, housing 12, and transverse frames 70 can each be molded plastic structures enclosing a plastic absorber 26. Alternatively, the housing 12 comprises the hollow continuous side wall 60 formed of extruded plastic. Various combinations of the opaque cover 10, housing 12, and transverse frames 70, can be molded as single pieces. Plastic materials exposed to incident solar energy in such low cost embodiments are preferably formed with resins containing ultraviolet inhibitors or can employ an exterior surface coating, adhesive or film specifically reflective for, or absorptive of, ultraviolet wavelengths. Further, a plastic opaque cover 10 and plastic absorber 26 can be formed with resins containing carbon black to provide for greater absorptance of incident radiant energy. A plastic solar collector of the present invention will provide improved performance, relative to unglazed plastic solar collectors, by reducing convective heat losses during cold weather operation.

The present invention can also be directed to a low cost embodiment wherein the opaque cover 10, housing 12, and transverse frames 70 are each metal, such as, for example, aluminum, combined with a PEX, PEX-AL-PEX, or EPDM rubber absorber 26. While such a combination would pose stagnation temperature issues for the plastic tubing in a glazed flat plate solar collector of the current art, comprising mass insulation in the side walls and behind the absorber, a solar collector of the present invention in an alternative embodiment without mass insulation can be engineered to limit stagnation temperatures to levels well tolerated by a plastic or rubber absorber 26 by, for example, employing a coating of the exterior surface 22 having reduced solar energy absorptance and a coating of the interior surface 24 having reduced infrared emittance.

Weight Advantage of Opaque Cover

The density of aluminum, an exemplary opaque cover material, is actually slightly greater than the density of glass, and the modulus of elasticity of aluminum is about the same as glass. Thus, a brief explanation as to the nature of the weight advantage of a solar collector of the present invention, in contrast to a flat plate solar collector comprising a glass cover plate, is useful. Using aluminum for exemplary comparison, the theoretical tensile and compressive strengths of aluminum and glass are comparable. However, glass breakage is statistically unpredictable because surface imperfections in glass plates cause irregular stress concentrations. Glass plates are also negatively affected by the duration of a load: A glass plate might sustain a short-term load during testing that exerts more than twice as much pressure as a long-term load that causes failure. For structural applications, a multiplier factor reflecting an adjustment for the statistical probability of failure is used to calculate required thickness of glass plates. It is not unusual for a glass plate to be about twice as thick as its theoretical strength might suggest is sufficient to meet the negative pressure associated with a design windload, or the long-term compressive force associated with an evacuated solar collector. Thus, a 4 millimeter thickness glass plate might be required to sustain the same design load as a 2 millimeter thickness aluminum sheet. Given the similar densities of glass and aluminum, the aluminum sheet will weigh about half as much as the glass plate. The weight advantage of an opaque cover with respect to glass is even more pronounced in alternative embodiments directed to low weight such as, for example, opaque covers comprising plastics or carbon fiber, or honeycomb sandwich structures with aluminum facing sheets much thinner than the 2 millimeter thickness example above.

Conclusion

Visible light comprises about 44% of the energy content of the solar spectrum, so it is counterintuitive that an opaque cover can transfer solar energy to an absorber within a solar collector enclosure at levels which, in some embodiments, approach the performance of low-iron glass. However, it has been found that an opaque cover combining high solar energy absorptance by the exterior surface with high infrared emittance from the interior surface to the absorber can provide acceptable and economical thermal performance.

The present invention is directed to a solar collector that is more robust, more durable, has a simplified construction, and requires less periodic cleaning than a solar collector with a transparent or translucent cover plate. The present invention does not require the cost and complexity, or experience problems unique to transparent and translucent glazing materials. The performance of an opaque cover is less affected by dust and grime on either side of the cover than transparent or translucent glazing. In some embodiments, the present invention avoids the costs and shortcomings associated with mass insulation, absorber fins, cover plate mullions, and corner joinery.

The present invention is directed to a solar collector that is suitable for operation with a variety of working fluids such as, for example, water, air, glycols, water-glycol mixtures, hydrocarbon oils, eutectic phenyl mixtures, phthalate esters, refrigerants, salts, and silicones.

The foregoing examples have been provided merely for the purpose of explanation and are in no way to be construed as limiting of the present invention. While the present invention has been disclosed with reference to exemplary embodiments, the words used herein are intended to be words of description and illustration, rather than words of limitation. Changes may be made, within the purview of the appended claims, as presently stated and as may be amended, without departing from the scope and spirit of the present invention in its aspects. While the present invention has been described with reference to particular materials and embodiments, the present invention is not intended to be limited to the particulars disclosed herein; rather, the present invention extends to all functionally equivalent structures and uses, such as are within the scope of the appended claims. All terms used in this disclosure should be interpreted in the broadest possible manner consistent with the context.

What is claimed is:

1. A solar collector for heating a working fluid, comprising:
   an opaque cover disposed as an outermost surface to receive incident solar energy and coupled to an upper portion of a housing, said opaque cover and said housing together defining an at least substantially airtight enclosure;
   an exterior surface of said opaque cover having solar energy absorptance greater than 0.80;
   an interior surface of said opaque cover having infrared emittance greater than 0.80;
   an absorber disposed within the at least substantially airtight enclosure in an opposing spaced apart relationship with said opaque cover, said absorber comprising a vessel for the working fluid;
   a first conduit disposed to supply the working fluid to the solar collector, projected through said housing and coupled to said absorber; and
   a second conduit disposed to extract the working fluid from the solar collector, projected through said housing and coupled to said absorber.

2. The solar collector of claim 1, wherein the exterior surface of said opaque cover is a selective coating having solar energy absorptance greater than 0.90 and infrared emittance of less than 0.30.

3. The solar collector of claim 2, further comprising a transparent protective coating disposed to isolate said selective coating from contact with ambient air.

4. The solar collector of claim 1, wherein said opaque cover comprises a laminated structure disposed in a sandwiched relationship between the exterior surface and the interior surface, said laminated structure having a first layer in contact with the exterior surface and a second layer in contact with the interior surface.

5. The solar collector of claim 4, wherein the thermal conductivity of said first layer is less than 2 W/m-° C. at 25° C., and the thermal conductivity of said second layer is greater than 15 W/m-° C. at 25° C.

6. The solar collector of claim 1, wherein said opaque cover comprises a honeycomb structure disposed in a sandwiched relationship between the exterior surface and the interior surface.

7. The solar collector of claim 1, wherein the outer surfaces of said absorber have infrared absorptance greater than 0.90.

8. The solar collector of claim 1, wherein the opposing spaced apart relationship of said absorber and said opaque cover defines a gap of at least 3 millimeters.

9. The solar collector of claim 1, wherein said absorber is disposed in a parallel aligned and spaced apart relationship between each of said opaque cover and a reflective surface below said absorber, said reflective surface having infrared reflectance greater than 0.60.

10. The solar collector of claim 9, wherein the spaced apart relationship between said absorber and said reflective surface defines a second gap of at least 3 millimeters.

11. The solar collector of claim 1, wherein said absorber comprises a plurality of interconnected tubes aligned in a parallel spaced apart relationship, the spaced apart relationship defining an average centerline spacing between the parallel tubes of 0.75 to 1.0 times the average tube circumference.

12. The solar collector of claim 1, wherein:
   said housing comprises an elongated hollow frame having a plurality of rounded corners and a first end rigidly coupled to a second end, said elongated hollow frame forming a continuous side wall, and a back plate coupled to a lower portion of said continuous side wall;
   said opaque cover is coupled to an upper portion of said continuous side wall; and
   a plurality of transverse frames supports and suspends said absorber within the at least substantially airtight enclosure such that said absorber is disposed in a spaced apart relationship with each of said opaque cover, said continuous side wall, and said back plate.

13. The solar collector of claim 12, wherein the radius of the outside surface of each rounded corner of said plurality of rounded corners is at least 8 centimeters.

14. The solar collector of claim 12, further comprising a mass insulation disposed within the hollow portion of said continuous side wall.

15. The solar collector of claim 13, further comprising a mass insulation disposed between said absorber and said back plate.

16. The solar collector of claim 12, further comprising a planar, transparent film disposed in a parallel aligned and spaced apart relationship between each of said opaque cover and said absorber.

17. The solar collector of claim 12, further comprising an airtight enclosure evacuated to a pressure of less than 1 torr.

* * * * *